Oct. 28, 1941.   D. E. EDGAR   2,260,890
METHOD OF PREPARING RESINOUS COMPOSITIONS
Filed Dec. 8, 1939
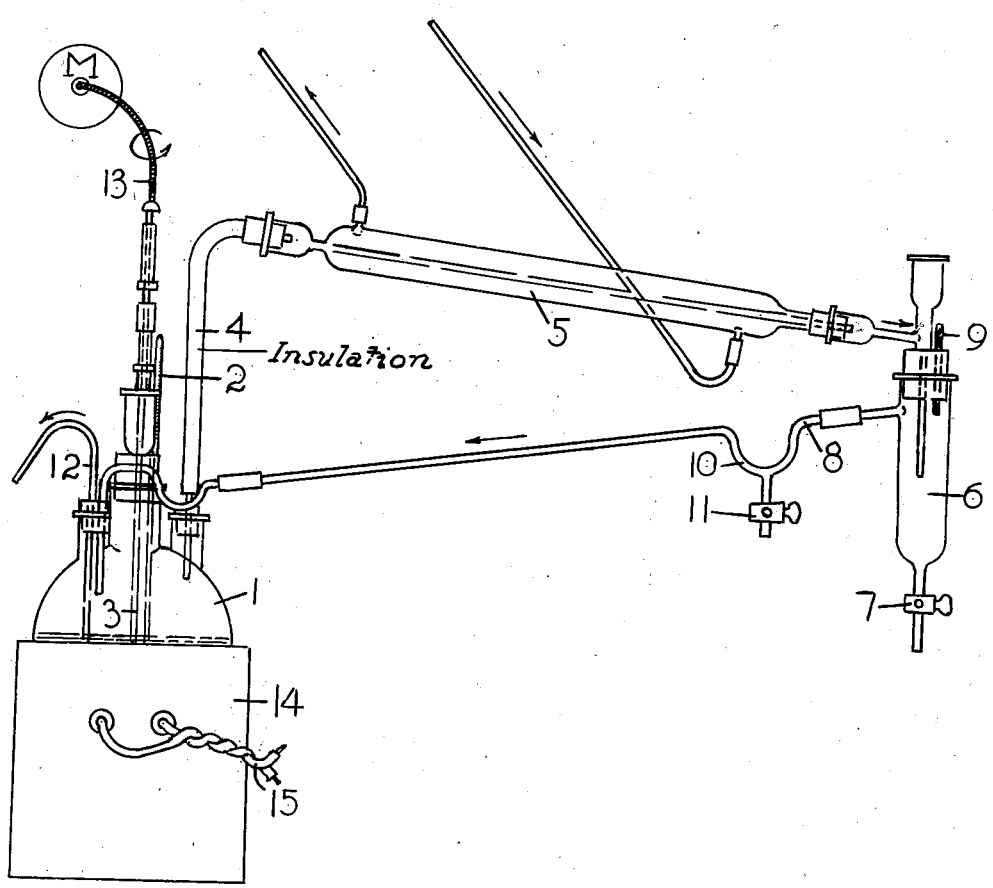
Donald E. Edgar  Inventor
By R. F. Miller
Attorney Patented Oct. 28, 1941

2,260,890

UNITED STATES PATENT OFFICE 2,260,890

METHOD OF PREPARING RESINOUS COMPOSITIONS

Donald E. Edgar, Philadelphia, Pa., assignor to E. I. du Pont de Nemours & Company, Wilmington, Del., a corporation of Delaware Application December 8, 1939, Serial No. 308,190

1 Claim. (Cl. 260—70)

This invention relates to resinous compositions, and more particularly to the manufacture of improved urea-formaldehyde resinous compositions adapted for use as decorative and protective films as well as for the production of molded products.

The products of the reaction and/or condensation of urea and aldehydes, particularly formaldehyde, are well known in the art. These products possess desirable properties of hardness and strength and further have excellent color, transparency and fastness to light. Such products have been used within recent years quite extensively in the field of molded plastics. Their use, however, has been limited in the field of coating compositions to produce decorative and protective films. This limitation is, among other reasons, apparently due to the practical insolubility of the products in suitable solvents and the instability of such solutions as could be produced. The physical properties of the films prepared from such solutions are also quite unsatisfactory being extremely brittle and lacking in the proper toughness. The property of brittleness has also limited to some extent the use of the products in the field of molded plastics. Methods for suitably plasticizing the products used for molded plastics have been found but no satisfactory means of plasticizing the urea-formaldehyde condensation products to be used as coating compositions has yet been developed. Various other types of film forming materials added to serve as plasticizers have been used but those which would appear to be desirable for this purpose were found to be unsatisfactory because of their incompatibility with the known ureaformaldehyde reaction product. Because of the desirable properties of freedom from color, transparency and fastness to light of the reaction and/or condensation products of urea and formaldehyde, film forming compositions of such products possessing in addition the properties of hardness and toughness are highly desirable from a commercial standpoint.

It has been proposed to improve resins of the urea-formaldehyde type by reacting with the formaldehyde an excess of urea over and above the usually used 1:2 mol ratio required for making the initial dimethylol urea. However, the use of this excess in the initial stages of the process or reaction does not produce the desired results of increased yield of resin and substantial freedom from uncombined formaldehyde of the finished product. It has also been proposed in processes for producing urea-formaldehyde reaction products to add the urea in small portions to the formaldehyde during the course of the reaction. This means, however, also does not produce the desired result in the finished product as indicated above. Other means have been proposed to accomplish the same purpose but these for various reasons have not been successful.

In copending application Serial No. 58,000 filed January 7, 1936, in the name of Edgar and Robinson there is disclosed a process for making a new and improved resin by reacting urea, formaldehyde and monohydric alcohol under certain conditions. These resinous solutions are of broad practical application in the protective and decorative coating art but the process for preparing them is capable of improvement with respect to increased yield of the product, substantial absence of free formaldehyde in the resin solution, decreased time and reduced baking temperature to form hard, tough films, therefrom and improved gloss of the film.

This invention therefore has as an object the preparation of a condensation product of urea and formaldehyde which, as compared to the condensation products heretofore made, possesses improved flexibility and toughness.

Another object is a process for the preparation of a condensation product of urea and formaldehyde which is compatible with the desirable types of plasticizers and other film forming materials and further is soluble in desirable solvents for commercial use such as hydrocarbons.

A further object is a process for the preparation of a condensation product of urea and formaldehyde in which there is a substantially complete reaction of the formaldehyde used so that the resulting product is substantally free of the odor of formaldehyde.

A still further object is the production of new and useful coating compositions comprising a condensation product of a urea and formaldehyde used in admixture with other film forming materials such as raw and treated animal and vegetable oils, natural resins, synthetic resins, plasticizers, waxes, etc. Other objects will appear hereinafter.

These objects are accomplished by a process in which in addition to formaldehyde and urea in amounts capable of forming dimethylol urea, a monohydric alcohol is a reactant as described in the above mentioned application, my new process being further characterized by the fact that additional urea is reacted after the initial reaction of the formaldehyde and urea but before completion of the resin-forming reaction. The reaction, which is more particularly described in connection with the specific examples and apparatus mentioned below, is carried out in the presence of a suitable solvent, and after partial completion of the reaction between the initially used or formed dimethylol urea and monohydric alcohol, urea in substantial amount is added. The reaction is then continued to completion with continued removal of water of reaction but with retention of solvent and alcohol, until substantially 2 molecules of water for each molecule of urea are eliminated and the resulting product contains an amount of combined alcohol equivalent to from about one-half to about one molecule of alcohol for each molecule of combined urea.

The attached drawing shows in elevation a diagrammatic representation of apparatus suitable for carrying out the invention.

The apparatus consists essentially of a reaction vessel or still 1 provided with a thermometer 2 and a mechanical stirrer 3 driven by a suitable source of power M applied through the cable 13 to the stirrer shaft. A tube 4 from the still leads to the top of a separator 6 by means of the tube passing through the water cooled condenser 5. The separator 6 is open to the atmosphere at 9 and is provided with an outlet at its lower end closed by a valve 7. The separator near its top opens into a tube 8 for the gravity passage of fluid into the still 1 as shown. The tube 8 has a trap 10 provided with a valved outlet 11. The still is open to atmospheric pressure by means of tube 12. The numeral 14 designates a suitable heating element connected to a source of current by leads 15.

The manner of carrying out the present invention will be more fully understood by the following examples which are given by way of illustration. The parts are by weight.

*Example I*

Seven hundred and forty-seven parts of a 37% aqueous formaldehyde solution was adjusted to a pH of approximately 8.6 by the addition of sodium hydroxide solution and then 700 parts by weight of isobutyl alcohol and 252 parts by weight of urea added. The resulting solution was heated to boiling (approximately 85° C.) and refluxed gently for approximately 30 minutes. One hundred parts of toluol and 10 parts phthalic anhydride were added and the reacting mass heated and distilled. The distillate separates into 2 layers, aqueous and non-aqueous; the latter is returned to the reaction vessel while the former is removed from the system. After approximately 605 parts by weight of water are removed, 15 parts by weight of urea are added to the reaction mass and the distillation continued, without the return of any distillate to the reaction vessel, until approximately 350 additional parts by weight of liquid have been removed from the reaction vessel. A clear and colorless resin solution in isobutanol of approximately 60% by weight solids is obtained. The resin solution is substantially free from the odor of formaldehyde. A coating on metal or other suitable base when baked for approximately 15 minutes at 100° C produces a hard, tough and durable film.

The urea and formaldehyde used in the first stage of the reaction in quantities calculated to yield dimethylol urea may be replaced as in the following example by preformed dimethylol urea. In either instance the present invention involves heating dimethylol urea with monohydric alcohol with removal of water and retention of the alcohol, adding urea before the resinification reaction is complete, and then continuing the heating with removal of water and retention of the alcohol as has been previously outlined.

*Example II*

Sixteen hundred and twenty parts of dimethylol urea containing 26% water was added to 2040 parts by weight of normal butyl alcohol and 200 parts by weight of toluol. 4.8 parts of 85% syrupy phosphoric acid was then added and the liquid heated to boiling and distilled. The water which separated from the distillate was removed from the system and the non-aqueous liquid returned to the reaction vessel. After approximately 500 parts of water were removed 72 parts of urea were added and the reaction continued but the distillate removed from the system. After the addition of the urea approximately 800 parts of distillate were removed. The mass remaining in the reaction vessel was filtered to remove insoluble foreign material and a clear and colorless resin solution in normal butanol resulted. The solution had a solids content of approximately 60% by weight and possessed the properties of the resin solution obtained in Example I.

The amount of water actually formed during the reaction may be determined by adding the amount measured as it is removed from the separator to the amount which remains dissolved in the organic liquid which is finally retained in the separator. The latter figure is determined with the aid of known solubility data of water in the organic liquid. The resulting product contains, as determined by analysis, approximately between 19 and 23% of nitrogen based on the solids and has been found of value when used as such in forming coating compositions.

The material prepared as described possesses sufficient flexibility for many purposes but may be advantageously blended with other film forming materials as alkyd resins, other types of synthetic resins, oleo-resinous varnishes, lacquers prepared from cellulose nitrate, ethyl cellulose, benzyl cellulose, etc., as well as with drying oils, non-drying oils and waxes. Further the material may be blended with natural resins such as copal, dammar, etc. For certain purposes it may be desired to obtain a more flexible film in which instance the material may be blended with solvent plasticizers such as dibutyl phthalate, tricresyl phosphate, triphenyl phosphate, dicyclohexyl phthalate, camphor, ethyl tartrate, butyl tartrate, ethyl lactate, butyl lactate, etc. either with or without other blending materials as noted above.

The resin solution has been found particularly advantageous for use where it is desirable to apply heavy or thick coatings to produce the finished film. Further the compositions as prepared in the examples may be used for coating various types of articles and after the practically complete removal of the solvent may be used as a molding material. Pigments and dyes may be incorporated to produce desired color in the finished product. Fillers may also be used.

It is to be understood that the mention of urea herein includes also substituted ureas such as alkyl, aryl and acyl ureas, thioureas, guanidine and substituted guanidines may be used. In using such substituted ureas it is preferred to use the procedure as described in Example I.

In place of butyl alcohol other aliphatic monohydric alcohols such as methyl, ethyl, propyl and octyl alcohol may be used, proper adjustment being made as to the relation between the quantity of alcohol and hydrocarbon such as benzene or toluene, in order to permit the proper separation of the water from the organic liquid as the distillate is collected in the separator. Higher alcohols such as benzyl and cyclohexyl alcohol may be used although their use is not preferred in most instances since the products are not in general as soluble as those prepared from the lower alkyl alcohols. Benzene and other hydrocarbons may be used in place of the toluol which is given in the examples. With the use of some alcohols it may not be necessary to use in addition a hydrocarbon since the water may be satisfactorily removed by other means as for instance by the use of silica gel in the separator, or by the use of an auxiliary fractionating column to separate the water from the alcohol before the latter is returned to the reaction vessel.

In addition to the phthalic anhydride and phosphoric acid noted in the examples other catalysts known to be useful for making urea-formaldehyde resins may be used, particularly useful are materials of an acidic nature such as benzoic and similar monocarboxylic acids, maleic acid, adipic acid and similar dicarboxylic acids as well as such tricarboxylic acids as citric acid, also acid salts and acid resins such as rosin, etc., and alkyd type resins. Further inorganic acids as hydrochloric and sulphuric acid are satisfactory. In addition certain inorganic salts such as mercuric chloride, aluminum chloride, stannic chloride as well as the halogens such as bromine and iodine may be used. Another useful catalyst is benzoyl peroxide.

The urea added after partial completion of the reaction and before the desired finished resin solution is obtained is preferably added when approximately from 50 to 98% of the total water (i. e. water of reaction plus any free water present) is removed during the distillation. The additional urea may be added in toto or in repeated small amounts. The urea-formaldehyde ratio in the completed reaction is preferably that of balanced molecular proportions. The urea added may vary conveniently between 2 and 10%, with from 3 to 5% preferred, of the dimethylol urea used or obtainable from the urea and formaldehyde initially used when the reaction is carried out as in Example I.

The product of the process of the invention is particularly adaptable for use as a protective and decorative coating on various types of surfaces as metal, wood, glass, hard rubber, molded plastic, synthetic resin products, etc., and may be applied by methods well known in the art as by spraying, brushing or dipping. When combined with other film forming ingredients as previously noted, compositions possessing varying properties may be obtained, depending on the particular application of the finished product. When used with cellulose derivatives baking at elevated temperatures is not necessary or desirable since the product will satisfactorily air dry. When combined with film forming materials other than cellulose derivatives, however, baking at elevated temperatures for a short period of time is usually desirable from an economic standpoint.

Products of the process of the present invention from which the solvent has been removed are found to yield on treatment with zinc chloride and acetic anhydride the acetate of the alcohol used in the process. For example, where butyl alcohol is used the above treatment yields butyl acetate. Similarly where other alcohols are used in the process the corresponding acetates are formed upon treatment of the product with the zinc chloride and acetic anhydride.

It will be seen from the foregoing that my improved process for preparing a resinous composition comprising the reaction product of urea, an aldehyde, and an alcohol may be prepared in such form as to be readily used as a protective and decorative coating composition either as such or in combination with other film forming materials to produce films which are hard, tough and water resistant.

In addition the improved process presents the advantage of increasing the yield of resin obtained in the process described in the mentioned application to the extent of from 8 to 10%. A further advantage is that substantially all of the formaldehyde used is reacted with the urea so that the finished resin solution is substantially free of uncombined formaldehyde as is evidenced by the substantial absence of formaldehyde odor and also by chemical tests. The resin solution obtained by my improved process yields decorative and protective coatings which may be baked at lower temperatures and for shorter periods of time to yield hard, tough and durable films. Other advantages will be readily apparent to those skilled in the art of preparing and using such resin solutions.

As many apparently widely different embodiments of this invention may be made without departing from the spirit and scope thereof, it is to be understood that I do not limit myself to the specific embodiments thereof except as defined in the appended claim.

I claim:

In a process for making resins the steps comprising heating in the presence of a catalyst a reaction mixture consisting essentially of a monohydric aliphatic alcohol and the reaction product of urea and formaldehyde, distilling and condensing the mixed vapors of alcohol and water evolved, separating the water from the condensate and returning the alcohol from which the water has been separated to said reaction mixture, adding urea to said mixture before completion of the resin-forming reaction, and after about 50% to 98% of the total water has been separated from the reaction mixture, said urea being added in amount from 2% to 10% of the dimethylol urea represented by said reaction product of urea and formaldehyde, and then completing the resin-forming reaction by continuing said heating with separation of water and return of alcohol to the reaction mixture until substantially two molecules of water for each molecule of combined urea are eliminated and a product is obtained which contains an amount of combined monohydric alcohol equivalent to from one-half to about one molecule of alcohol for each molecule of combined urea.

DONALD E. EDGAR.